United States Patent [19]

Falck et al.

[11] Patent Number: 5,251,733
[45] Date of Patent: Oct. 12, 1993

[54] TRANSMISSION CONTROL WITH LIMP-HOME FUNCTION

[75] Inventors: Peter L. Falck, Waterloo; Charles W. Formwalt, Jr., Janesville, both of Iowa

[73] Assignee: Deere & Company, Moline, Ill.

[21] Appl. No.: 923,701

[22] Filed: Jul. 31, 1992

[51] Int. Cl.$^5$ ............................................. B60K 41/28
[52] U.S. Cl. ........................... 192/0.092; 192/3.58; 192/3.62; 192/3.63; 74/850; 74/866
[58] Field of Search .............. 192/3.58, 3.62, 3.63, 192/0.092; 74/850, 866, 878

[56] References Cited

U.S. PATENT DOCUMENTS

Re. 34,064 9/1992 Tury et al. ................. 74/866 X
4,855,913 8/1989 Brekkestran et al. ........... 74/866 X

OTHER PUBLICATIONS

Deere & Company, "8560, 8760 and 8960 Schematic, Chart No. 5, RW19653", (not published).
Deere & Company, "8560, 8760 and 8960 Tractors Operation and Tests, Technical Manual", Mar. 1992, p. 240-50-17.
Ford New Holland, "Part 5-Transmission System", 1990, Chapters 5 and 6.
Ford New Holland, "Powershift Transmission Main Wiring Diagram", 1990.

Primary Examiner—Richard M. Lorence

[57] ABSTRACT

A control system for a vehicle powershift transmission includes a set of electrical connectors which in a normal mode, permit electrical power to be transmitted to microprocessor-controlled valve drivers for the transmission clutch control valves. These connectors may be swapped, in a limp-home mode, to permit power to be transmitted directly to the transmission clutch control valves. In both modes, a start-in-gear protection circuit including a pair of relays and switches coupled to the shift lever prevents the vehicle from being started up with a gear engaged. In the limp-home mode, a limp-home relay and a clutch disengaged switch prevents gear engagement until the operator has depressed and then released the clutch pedal, and the clutch pedal may be operated to modulate and control gear engagement.

7 Claims, 9 Drawing Sheets

TRANSMISSION CONTROL WITH LIMP-HOME FUNCTION

BACKGROUND OF THE INVENTION

This invention relates to a vehicle transmission control system, in particular an electronic control system for a powershift transmission having a limp-home capability.

In an electrohydraulically controlled power shift transmission (PST), proper function is dependent on several components. These components include the operator controls (e.g. shift lever and associated parts), the microcomputer-based transmission controller, the electrohydraulic valves, the wiring and the transmission elements. If any of these were to fail, the operator may lose at least part of the normal transmission function. In a worst case, the transmission would no longer carry torque and the tractor would not move. Loss of tractor motion is a major failure, so it is desirable to have a transmission system with a "limp-home" capability wherein limited tractor motion is provided in case of failures of the PST system with only the components which are normally sold as part of the tractor. In other words, the tractor must move under its own power with whatever function of the transmission is available.

A known transmission for a production agricultural tractor provides a limp-home function by disconnecting a wiring harness from the transmission controller and then connecting the two harness connectors together. It is believed that, with this known system, a clutch switch is normally closed which enables the limp-home function. Therefore, the clutch pedal need not be used when operating in the limp-home mode. However, the clutch pedal as well as the shift lever can be used to stop vehicle motion. When the clutch pedal is fully depressed, the clutch switch opens, thereby dropping power to a transmission control valve solenoid which is required for motion in both first forward gear and first reverse gear. Non-modulated engagement will occur when the shift lever is moved into gear with the clutch pedal released or when the clutch pedal is released with the shift lever in gear. Gear engagement with this system cannot be modulated by operation of the clutch, and therefore generates a jerk to the operator which is worse when engagement occurs at higher engine speeds. With this known system, only first forward and reverse gears are available in the limp-home mode. As a result, the tractor is unusable for continued work. It would be desirable to have a limp-home function which would permit modulated engagement and which would enable a gear which is in the working range.

Also with this known system, if the tractor stops as a result of some failure, and the operator leaves the engine running and the shift lever in gear, and then the operator swaps the limp-home connectors, gear engagement may result. Gear engagement could occur as soon as the limp-home connectors are mated. It would also be desirable to have a limp-home function which does not override start-in-gear protection and which permits operator modulation of transmission torque. Also with this known system, if the ignition key switch is turned on, and then a limp-home gear is engaged, and then the engine is started at the starter solenoid, the transmission will carry torque when hydraulic pressure is high enough.

Another known production powershift transmission also has a limp-home function. This is obtained by swapping certain connectors and then operating a momentary switch which allows one forward and one reverse gear. This limp-home circuit requires that the operator manually maintain the switch actuated in order to maintain motion. If the switch is released, the transmission disengages. This limp-home circuit is intended only for moving the tractor onto a vehicle or to a repair area and is not intended for continued working. It bypasses all electronic functions, including the shift quadrant and any motion preventive features, such as start-in-gear protection, as well as the transmission controller. This system would also allow gear engagement if the limp-home switch had failed or had been defeated such that it was stuck in the forward or reverse position.

SUMMARY OF THE INVENTION

An object of the present invention is to provide a limp-home function for a control system for a powershift transmission which permits modulated gear engagement.

Another object of the invention is to provide such a limp-home function method which does not defeat start-in-gear protection.

These and other objects are achieved by the present invention wherein a control system for a vehicle powershift transmission includes a set of electrical connectors which, in a normal mode, permit electrical power to be transmitted to microprocessor-controlled valve drivers for the transmission clutch control valves. These connectors may be swapped, in a limp-home mode, to permit power to be transmitted directly to the transmission clutch control valves. In both modes, a start-in-gear protection circuit including a pair of relays and switches coupled to the shift lever prevents the vehicle from being started up with a gear engaged. In the limp-home mode, a limp-home relay and a clutch disengaged switch prevents gear engagement until the operator has depressed and then released the clutch pedal, and the clutch pedal may be operated to modulate and control gear engagement.

BRIEF DESCRIPTION OF THE DRAWINGS

FIGS. 4b–4f are combined to show a circuit diagram of the control circuit of the present invention.

DETAILED DESCRIPTION

Figure 1:
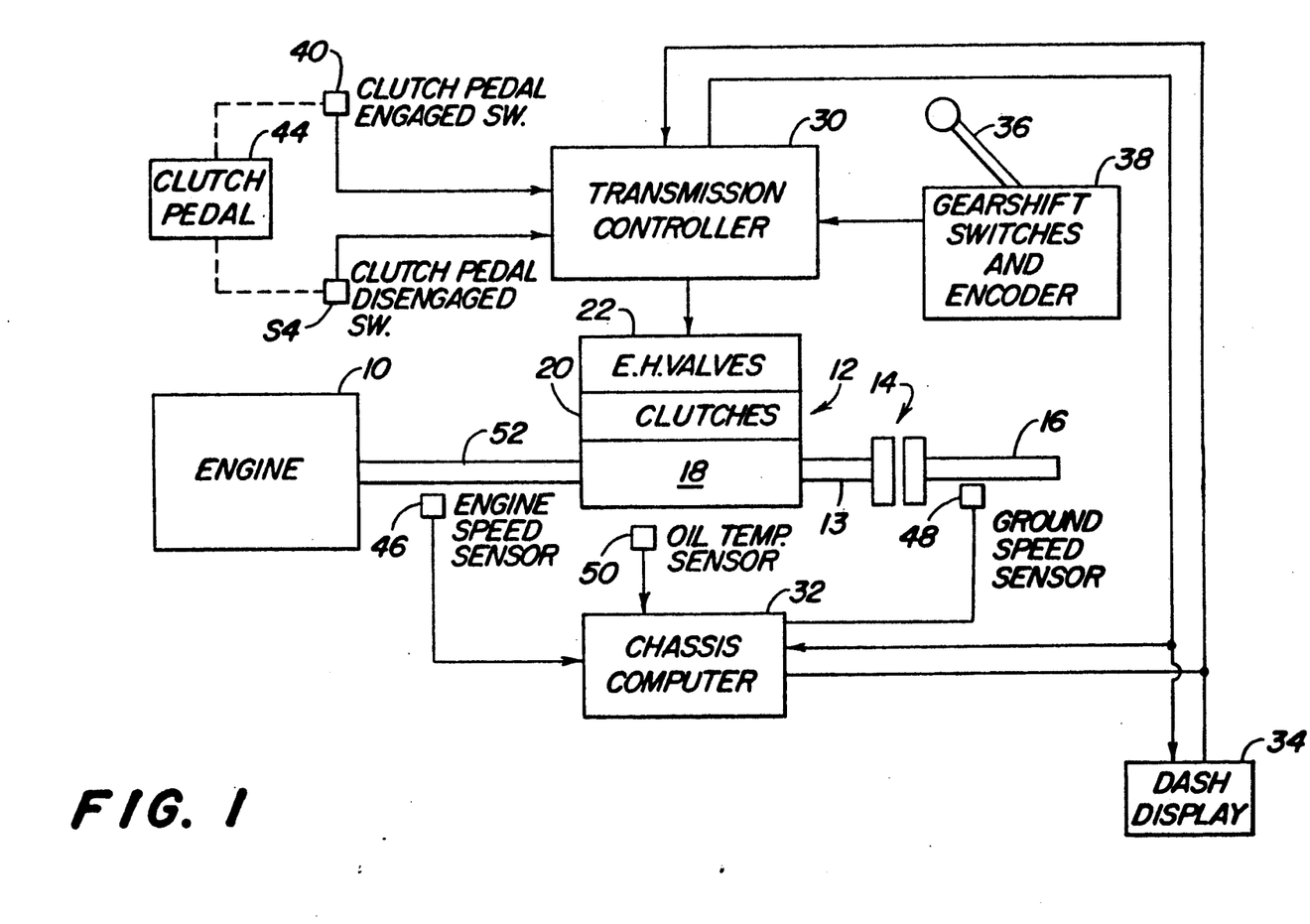
FIG. 1 is a schematic block diagram of a microprocessor-based transmission control system to which the present invention is applicable.

As shown in FIG. 1, a vehicle power train includes an engine 10 which drives a power shift transmission 12, which has an output shaft 13, which, via a conventional tow disconnect mechanism 14, drives an output drive shaft 16 which is connected to drive wheels (not shown). The power shift transmission 12 includes a transmission 18 which is operated by a set of pressure operated control elements or clutches 20 which are controlled by a corresponding set of solenoid operated proportional control valves 22. The transmission 18 may be a transmission such as described in U.S. Pat. No. 5,011,465, issued Apr. 30, 1991 to Jeffries et al., and assigned to the assignee of this application. The valves 22 may be two-stage electrohydraulic valves as described in U.S. Pat. No. 4,741,364, issued May 3, 1988 to Stoss et al. and assigned to applicant's assignee.

The power shift transmission control system includes a transmission control unit 30, a chassis computer 32 and a dash display 34. The transmission control unit 30 and the chassis computer 32 are preferably microprocessor-based electronic control units. Manual control is achieved via a gearshift lever 36. A gearshift switches and encoder unit 38 provides signals representing the position of the lever 36 to the transmission control unit 30. A clutch engagement switch 40 and a clutch disengagement switch S4 provide signals representing the position of a clutch pedal 44. The chassis computer 32 receives signals from an engine speed sensor 46. The chassis computer 32 also receives signals from a ground speed sensor 48 and a transmission oil temperature sensor 50. The chassis computer sends information from these sensors to the transmission control unit 30 and to display 34.

The transmission control unit 30 includes a commercially available microprocessor M which supplies control signals to a set of valve drivers 24 which provide variable duty cycle pulse-width-modulated voltage control signals to the valves 22. The transmission control unit 30 and the valve drivers 24 will generate such control signals as a function of various sensed and operator determined inputs in order to achieve a desired pressure in the clutches and to thereby control the shifting of the transmission 12 in a desired manner. However, the present invention is not concerned with the control of the shifting of the transmission 12, the transmission 12 itself, or the valves 22, since the present invention is concerned only with the limp-home aspect of the control circuit shown in FIGS. 4b-4f.

Figure 2:
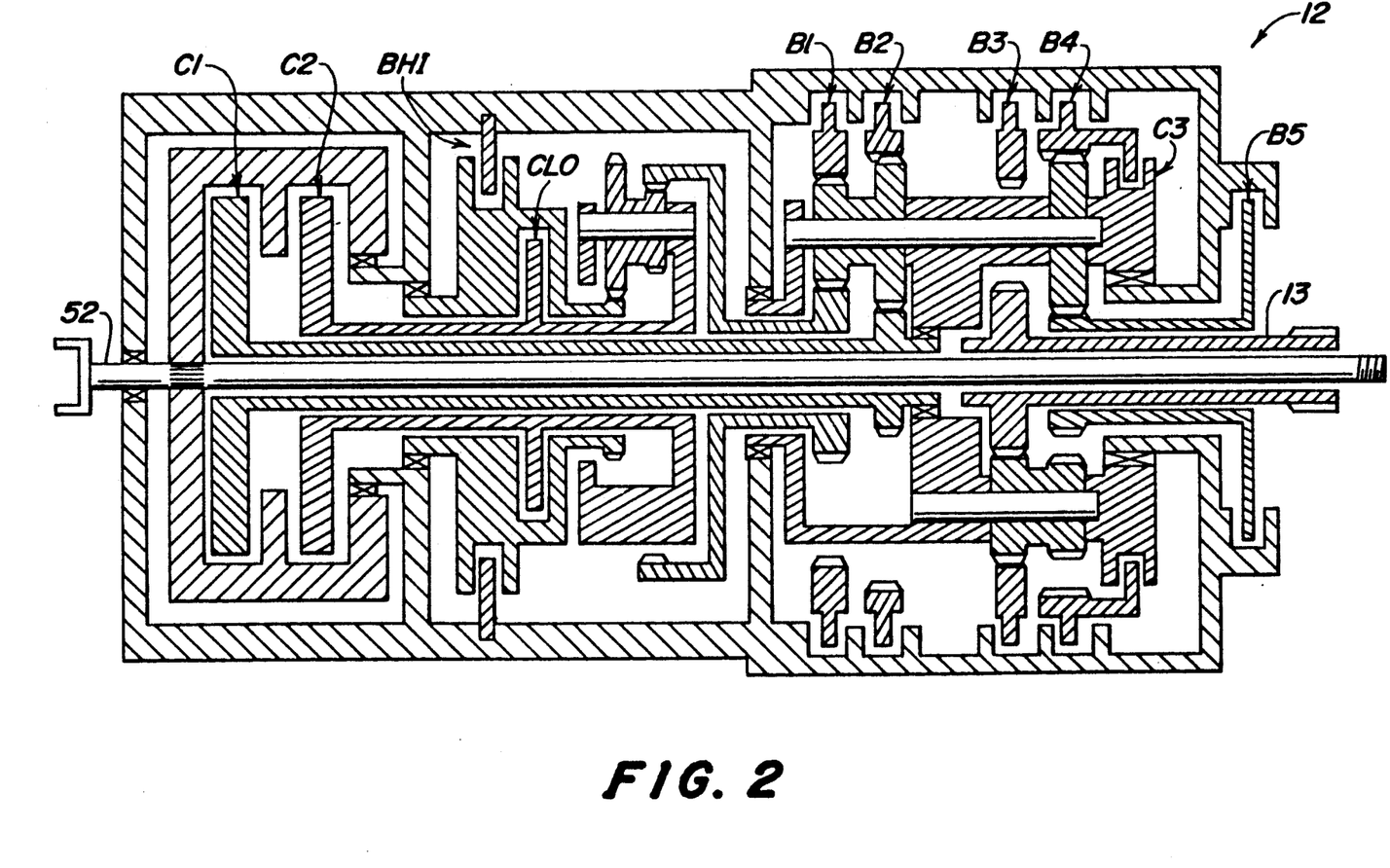
FIG. 2 is a schematic representation of a transmission to which the present invention is applicable.
Figure 3:
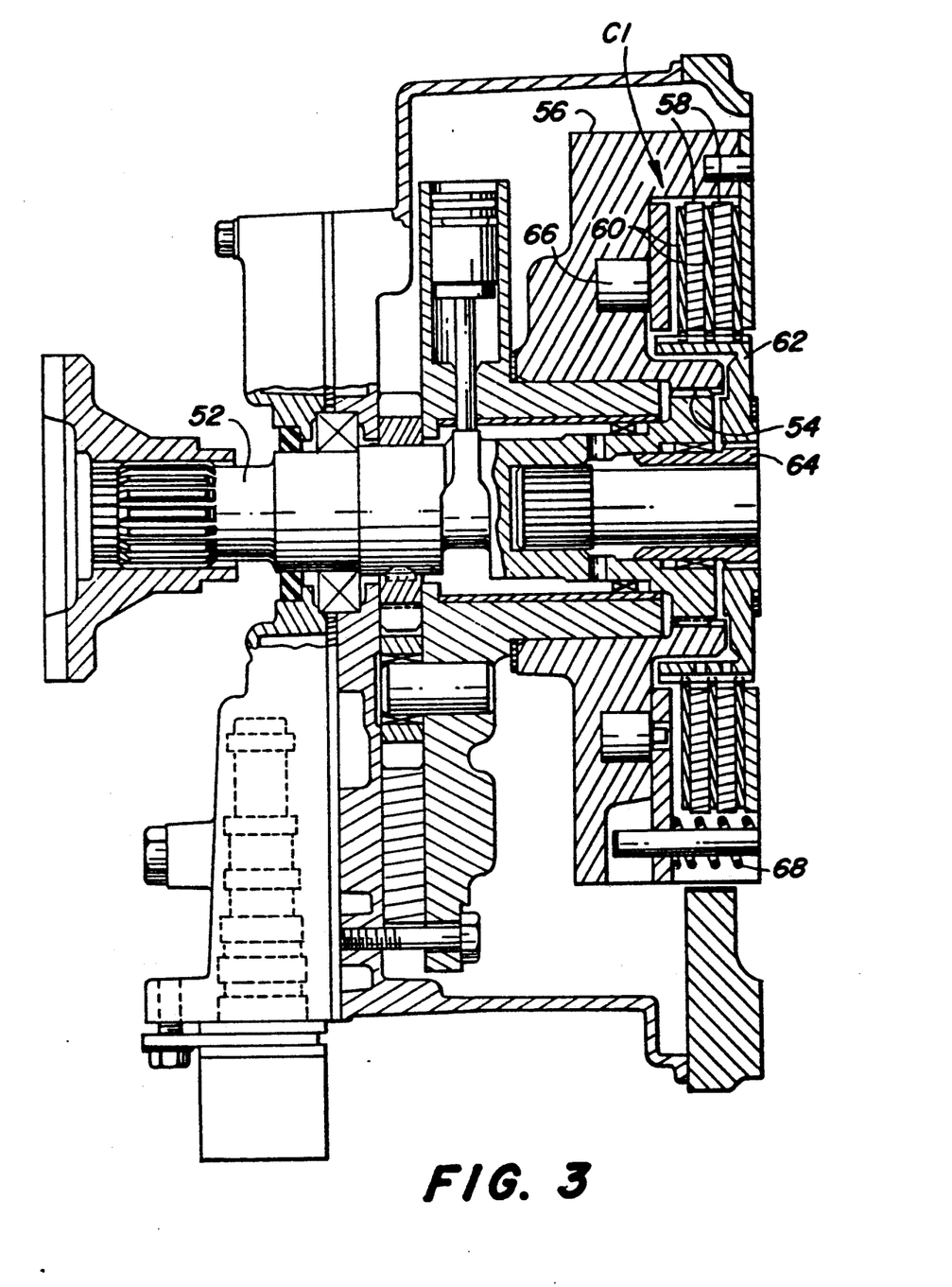
FIG. 3 illustrates in greater detail a portion of the transmission of FIG. 2.
Figure 4A:
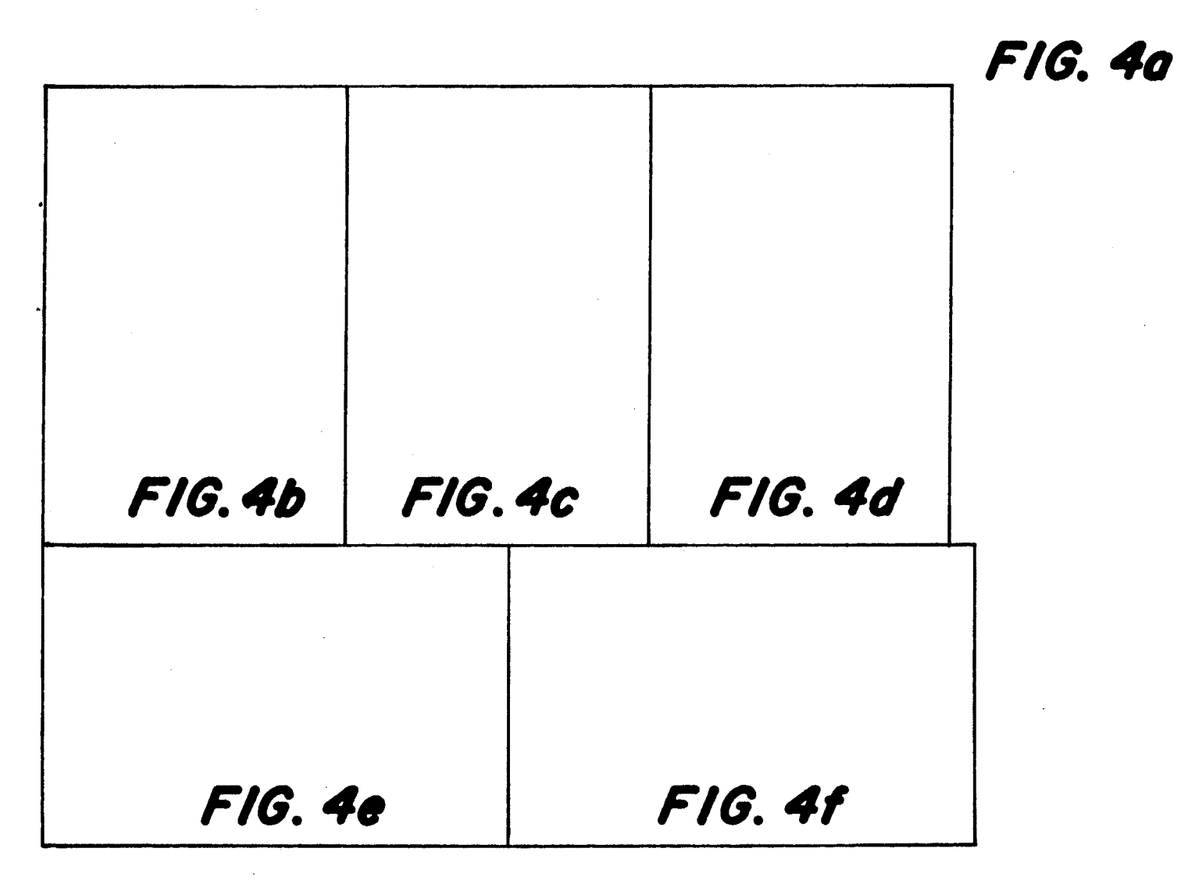
FIG. 4a shows the arrangement of FIGS. 4b–4f.
Figure 4B:
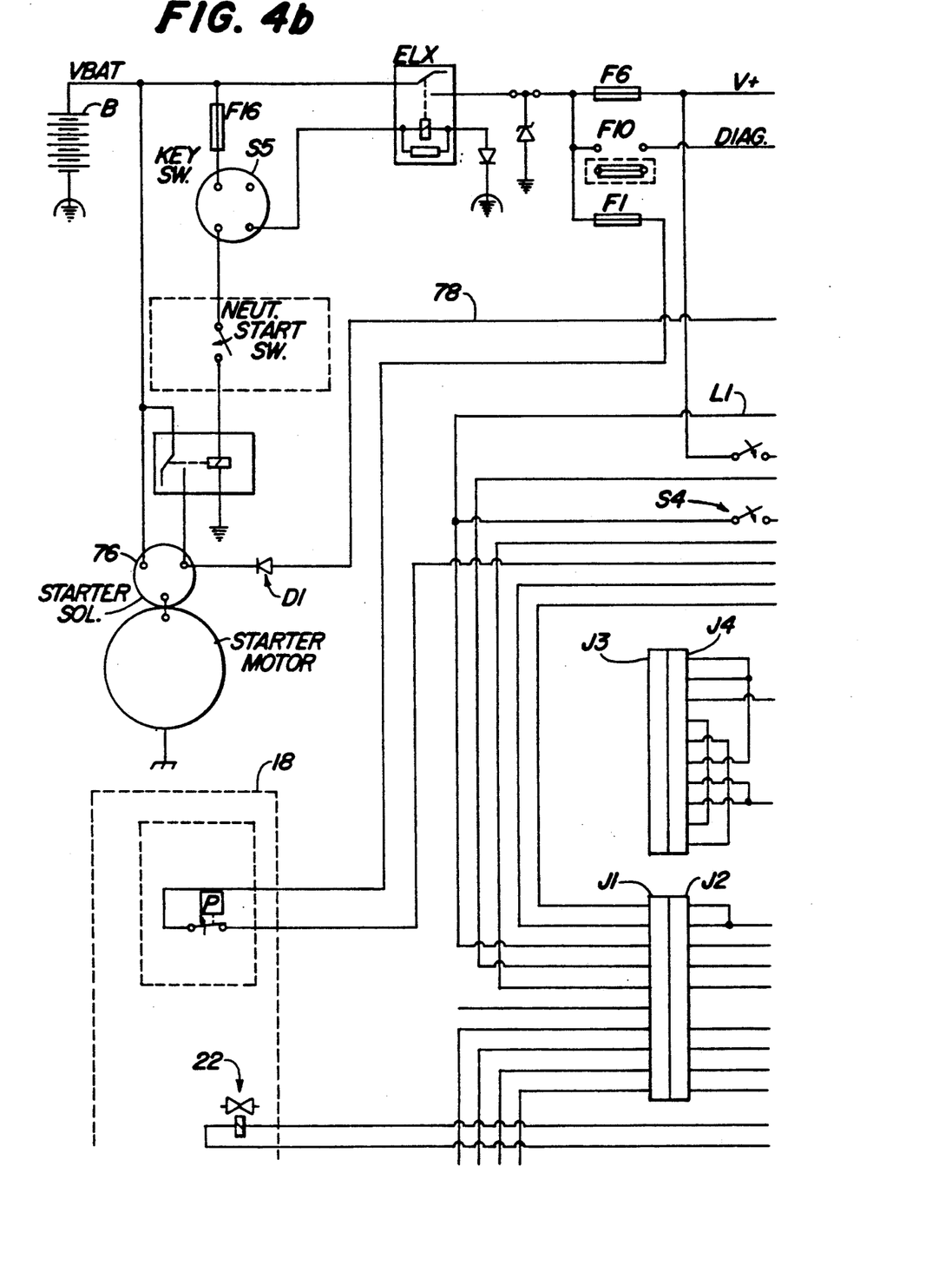
Figure 4C:
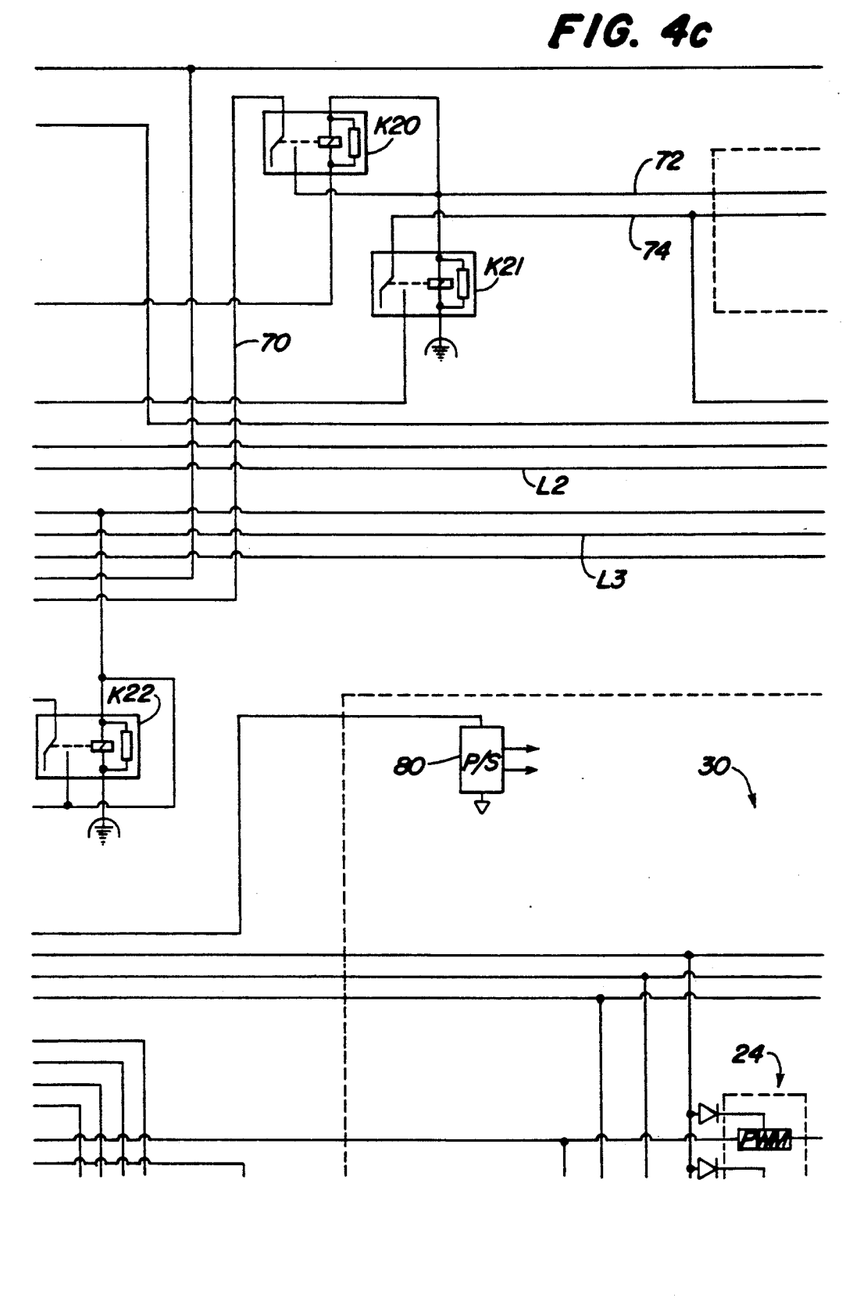
Figure 4D:
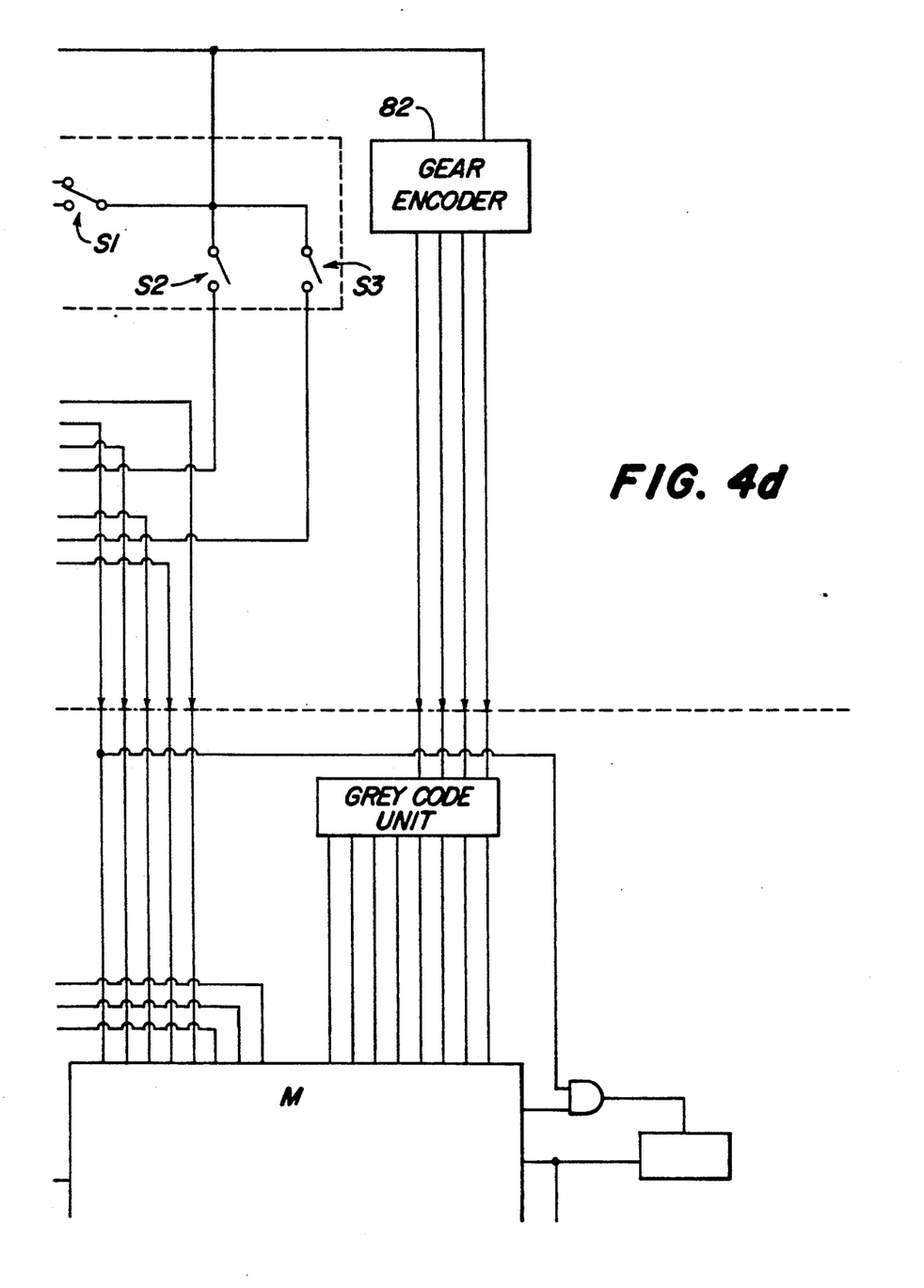
Figure 4F:
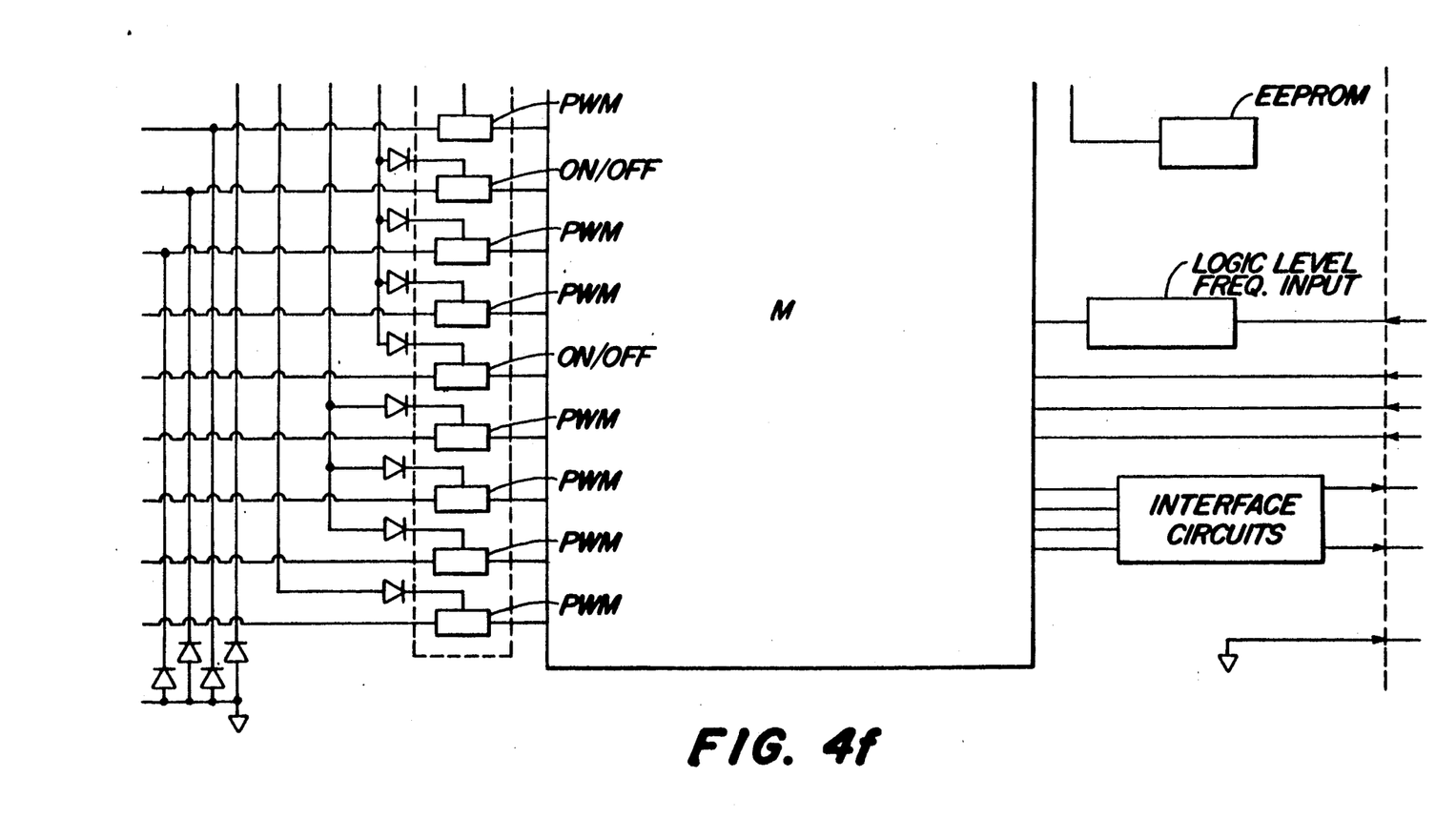

Referring to FIGS. 2 and 3, the control elements of transmission 12 include a set of brake elements B1, B2, B3, B4 and B5, and a set of clutch elements C1, C2, C3, and CLO. The input shaft 52 is connected by splines 54 to the clutch drum 56 of clutch C1 and of clutch C2 (not shown in FIG. 3). The drum 56 in turn is splined to the clutch separators 58 of clutch C1. The clutch disks 60 of clutch C1 are splined to the clutch hub 62 of clutch C1. The clutch hub 62 is splined to a first intermediate shaft 64. The first clutch C1 is provided with a piston 66 for activating the clutch C1 by compressing the clutch separators and disks 58, 60. A spring 68 is provided to bias clutch C1 out of engagement. The clutch piston 66, as well as the pressure operated elements of the other clutches and brakes, are each provided with hydraulic fluid from a pump (not shown) under the control of a corresponding one of the valves 22, in the usual fashion which is well-known to one of ordinary skill in the art, and therefore will not be described further herein. For further information regarding the details of such a transmission reference is made to U.S. Pat. No. 5,011,465, which is incorporated by reference herein.

The circuit shown in FIGS. 4b-4f functions to provide one forward and one reverse gear if a failure occurs in a component resulting in loss of normal transmission operation. This circuit includes a first pair of mating 10-terminal connectors J1, J2 and a second pair of mating 10-terminal connectors J3, J4, a limp-home relay K22, and a "clutch disengaged" switch S4. During normal operation connectors J1 and J2 are mated together and connector J4 is covered with connector J3 which functions as a dust cap.

During normal operation 12 volt power is supplied from battery B, via fuse F6 and line V+ to pin V+ of connector J1, to pin B of J2. Pin B supplies 12 volt power to the controller power supply P/S and also to the start-in-gear (SIG) protection relays K20 and K21 through pin A of connector J2, pin SG of connector J1 and line 70.

Line V+ also supplies power to the common terminals of not neutral switch S1, forward switch S2 and reverse switch S3. Switch S1, and directional switches S2 and S3 are operatively coupled to the shift lever 36. When lever 36 is in its neutral position switch S1 connects power to neutral line 72, and when lever 36 is not in its neutral position switch S1 connects power to not-neutral line 74. Switch S2 connects power to forward line L2 when lever 36 is in a forward gear position and disconnects line L2 from the power when lever 36 is not a forward gear position. Switch S3 connects power to reverse line L3 when lever 36 is in a reverse gear position and disconnects line L3 from the power when lever 36 is not in a reverse gear position.

Line 72 is connected to one side of the coil of SIG latching relay K20. Latching relay K20 has a pin 30 connected to line 70 and a pin 87 connected to line 72 and to one side of the coil of SIG enabling relay K21. The other side of the coil of relay K20 is connected to the starter solenoid 76 via line 78 and diode D1. Pin 30 of SIG enabling relay K21 is connected to line 74 and pin 87 is connected to not neutral line L1.

A clutch disengaged switch S4 is connected between line L1 and pin 85 and one side of the coil of limp-home relay K22. Relay K22 has a pin 30 connected to pin C of connector J4, a pin 87 connected to pin 85 and to pins G and H of connector J4.

Connector J1 has a pin SG connected to line 70, a pin V+ connected to line V+, a pin NN connected to line L1, a pin F connected to line L2, a pin R connected to line L3, a pin LS connected to a tachometer (not shown), a pin C2 connected to clutch control valve C2, a pin B1 connected to clutch control valve B1, a pin B5 connected to clutch control valve B5, and a pin B4 connected to clutch control valve B4.

Connector J2 has pins A and B connected together and to the controller power supply, pins C, D and E connected to the microprocessor 82, unconnected pin F and pins G, H, J and K connected to the drivers 24 for control valves C2, B1, B5 and B4, respectively.

Connector J3 merely serves as a dust cap for connector J4. Pins A, B and F of connector J4 are jumpered together, as are pins D and J and pins E and K. Pin C of connector J4 is connected to pin 30 of relay K22, and pins G and H of connector J4 is connected to pins 87 and 85 of relay K22.

MODE OF OPERATION

Normal Operation—Start-In-Gear Protection

When power is turned on with switch S5 while the shift lever 36 is in gear, switch S1 and the start-in-gear relays K20 and K21 will prevent power from reaching the non-neutral line L1 which supplies power to the B1 and C2 transmission element control valves. This is because when the transmission lever 36 is in gear, switch S1 disconnects line 72 neutral from power, and the relays K20 and K21 will remain off. Since switch S1 disconnects line 72, there is no way to energize relays K20 and K21. So, if the engine is started in this condition, the B1 and C2 control valves will not be energized and the transmission 18 will not be carrying torque.

To actually engage a gear, the shift lever 36 must be moved to its neutral position so that switch S1 energizes line 72. This applies power through line 72 to the coil of relay K20 so that relay K20 closes its contacts and supplies power through that contact to its own coil and also to the coil of K21. So, now that K20 and K21 are both energized and K20 is latched, the shift lever 36 is moved into a gear position so that switch S1 energizes line 74. The closed contacts of relay K21 pass power from V+ via line 74 to line L1, to the clutch disengaged switch S4, and also to pin C of connector J2 which supplies signal L1 to the transmission control unit 30 and thus to six of the valve drivers 24. With this signal to the valve drivers 24 completed, the control unit 30 will be able to provide gear engagement in accordance with the motion of shift lever 36.

If the controller 30 controls a combination of the valve drivers 24 in response to shift lever 36 such that gear engagement is obtained, but the engine 10 is not running, the circuit of the present invention will stop gear engagement if the engine 10 is started by shorting across the terminals of the starter solenoid 76. This is because the start-in-gear circuit will shut off power to the drivers for solenoids C1, C2, B1, and B2. Power to the clutch cooling and input planetary valve drivers is also shut off, but these are not required for gear engagement. Power to these valve drivers is shut off because the ground circuit for latching relay K20 includes the low resistance coil of the starter solenoid 76, so when the battery voltage is applied to the ST terminal of the starter solenoid 76, the series diode D1 is reversed biased and there is no longer a ground path through the coil of relay K20 and relay K20 de-energizes. The diode D1 also prevents power at the starter solenoid 76 from energizing the series combination of K20 and K21 when the shift lever 36 is not in neutral.

The foregoing describes the "start-in-gear" protection which is operative when the connectors J1, J2, J3 and J4 are in the normal operating position shown in FIGS. 4b–4f. As will be described later, this "start-in-gear" protection is also operative when the connector J1 is connected to J4 and the limp-home function is activated.

Limp-Home Operation

In order to engage a gear, certain ones of the solenoid valves 22 must be energized in the appropriate manner and in certain combinations. The power for all transmission control valves 22 comes via three lines. "Not neutral" line L1 provides power for six valves, forward line L2 provides power for three valves, and reverse line L3 provides power for one valve. The power to these three lines L1, L2 and L3 is controlled by switches S1, S2 and S3 respectively. In the normal operating mode lines L1, L2 and L3 supply power to the electronic valve drivers 24 via connectors J1 and J2.

If connector J1 is disconnected from connector J2 (as when the limp-home function is to be activated), these three lines L1, L2 and L3 no longer supply power to the valve drivers 24, thus preventing any of valve 22 from being turned on. This is important because if the controller is energizing some of the valves 22 at the same time the operator is trying to use the limp-home gears, lockup of the transmission 18 is likely to occur making the limp-home function inoperative. Also, power to relays K20 and K21 passes through the connector pair J1, J2 so that a gear of the transmission will not be engaged if connector J1 is removed from connector J2 and then mated with J4 while the engine 10 is running and the shift lever 36 is in a forward or reverse gear position. This is because disconnecting J1 from J2 de-energizes line 70 and breaks power to relay K20, and if the shift lever 36 is in a gear position, switch S1 will be in its "not neutral" position. Therefore, relays K20 and K21 will be de-energized, thus de-energizing the "not neutral" line L1. This cuts off power to a set of the valve drivers 24 and prevents engagement of any gear by preventing actuation of clutch elements C1, C2, B1 and B2.

The following discussion now assumes that the "limp-home" function is activated by disconnecting connector J1 from connector J2 and then coupling connector J1 to connector J4. Preferably, the operator will uncouple both pairs of connectors and couple the dust cap connector J3 to J2 to protect J2.

The circuit provides for two limp-home gears when J1 is connected to J4. Gear 9F is the forward gear and gear 4R is the reverse gear. The selected gear is determined by whether the forward switch S2 is closed, or whether the reverse switch S3 is closed. To activate gear 9F the valves 22 for transmission control clutches B1, C2 and B5 must be energized. To activate gear 4R the valves 22 for transmission control clutches B1, C2 and B4 must be energized. The two gears have transmission elements B1 and C2 in common, and for either gear, all three elements must be on in order for power to be transmitted through the transmission 18.

Preferably, the engine 10 will be turned on with shift lever 36 in neutral. Then, as soon as the key switch S5 is released, the relay K20 is energized by line 72 from switch S1. The closure of the contact of relay K20 keeps K20 energized, and thus relay K21 is also energized. This enables power to certain of the transmission solenoid valves 22 through relay K21 when switch S1 switches to "not neutral" when the shift lever 36 is moved to a forward or reverse gear position. Since the shift lever is in neutral, line L1 will be de-energized, and therefore relay K22 will be de-energized.

To engage a limp-home gear, the operator must move the shift lever 36 into any forward position to engage gear 9F, or into any reverse position to engage gear 4R, fully depress the clutch pedal 44, and then release the clutch pedal 44 to modulate engagement of the limp-home gear.

When the shift lever 36 is in a forward gear position, the forward switch S2 closes. This immediately energizes line L2 and the solenoid valve for element B5 because of the jumper wire between pins D and J of connector J4. When the shift lever 36 is in a reverse gear position, the reverse switch S3 closes. This immediately energizes line L3 and the solenoid valve for element B4 because of the jumper wire between pins E and K of connector J4. However, the transmission 18 will not be in gear unless the clutch pedal is also fully depressed. This is because until clutch disengaged switch S4 is closed, relay K22 stays de-energized which keeps the solenoid valves for transmission control elements B1 and C2 de-energized.

The operator must fully depress the clutch pedal 44 while the shift lever is in either forward or reverse each time the operator wants to engage a limp-home gear. (Using the clutch pedal is not required in order to shift the PST transmission in normal operation.) This causes switches S1 and S4 to be on at the same time, which must occur in order to energize and latch relay K22. When K22 is energized, current flows through switch S1, line 74, the closed contact of relay K21, through pins C of connectors J1 and J4, through the closed contact of relay K22, and through pins H and G of connectors J1 and J4 to the solenoid valves for elements B1 and C2. The now closed contacts of relay K22 maintains voltage across the coil of K22 so that the clutch pedal 44 can be released (opening switch S4), so that the transmission 18 can transmit torque.

Every time the shift lever 36 is moved to neutral, K22 is de-energized because switch S1 opens. As a result, to shift back into gear, the operator will again have to manipulate the shift lever 36 and depress and release the clutch pedal 44 as described in the preceding paragraph. The reason for relay K22 is to make sure the operator is in control of the vehicle when shifting into a limp-home gear.

In order to notify the operator that transmission operation is abnormal, a 12 volt (nominal) signal is sent to the dashboard display 34 whenever the key switch S5 is on ("run" position) and J1 is connected to J4. Power for this signal comes from J1 pin B and is routed to J1 pin F by the jumper wire between J4 pin B and J4 pin F. This signal activates a gear symbol annunciator on the dashboard display 34.

Even if the operator is not aware, or forgets, that the limp-home function is activated, the use of the clutch pedal 44 will provide additional control of the vehicle by modulating the engagement of the limp-home gear as the clutch pedal 44 is released. Without this feature, the transmission would otherwise lurch into gear as soon as the shift lever 36 leaves neutral.

This limp-home circuit is specifically intended for use by the operator when it is important to continue working with the tractor. Because of this, the shift lever switches S1, S2 and S3 must be functional, relays K20, K21 and K22, and clutch disengaged switch S4 must be functional. These components provide the necessary protection against unexpected motion as well as allowing the operator to use the normal controls for operating the transmission.

With this limp-home design, field operation can continue even though the chasis computer, transmission controller, the gear encoder, the ground speed sensor, the serial data bus, or the microprocessor M may have failed. The gear encoder 82 provides information to the transmission controller 30 to indicate the position of the shift lever 36. The transmission controller 30 will not allow gear engagement if the gear encoder 82 is not working. Wheel speed information is important to normal operation of the transmission controller 30. If the engine 10 is running and the transmission 18 is in gear and the clutch (not shown) is fully engaged, then the tractor should be moving. If the transmission controller 30 is not receiving wheel speed information, then the transmission controller 30 must command neutral in case a problem actually exists where unexpected motion may occur. The limp-home function of the present invention allows the operator to modulate the engagement into a gear with the clutch pedal 44 because the clutch (not shown) has a mechanical linkage (not shown) to a hydraulic valve (not shown) in the transmission 18. Therefore an electronic failure in the system does not affect the operation of the clutch pedal 44.

Limp-Home Operation—Start-In-Gear Protection

If the tractor is operating normally, and then stops because one of the circuits goes bad to one of the transmission control valves 22, (but not to a valve required for the limp-home mode), then the engine 10 is still running and the lever 36 is still in gear and the operator may have previously stepped on the clutch pedal 44 so that limp-home relay K22 may, at this time, be energized. Now, if the operator swaps the limp-home connectors J1 and J3 to attempt to enable the limp-home function, gear engagement is prevented because the power supply to terminal 30 of relay K20 is routed through connectors J1 and J2. This power supply is cut off when connector J1 is disconnected from and J2 because pins A and B are shorted together on the controller's side of connector J2. So, when the limp-home connectors are swapped, connectors J1 and J2 are first disconnected, and that will open relays K20 and K21. Then, when connector J1 is mated with J4 to enable the limp-home mode, the start-in-gear relays K20 and K21 will prevent immediate gear engagement. Gear engagement remains prevented until the shift lever 36 is returned to neutral and until the limp-home relay K22 is latched as a result of fully depressing the clutch pedal 44.

The circuit of the present invention will also prevent gear engagement if the engine 10 is started by shorting across the terminals of the starter solenoid 76, because the start-in-gear circuit will shut off power to the B1 and C2 solenoid valves if the engine 10 is started, thus preventing gear engagement. This is because the ground circuit for latching relay K20 includes the low resistance coil of the starter solenoid 76, so when battery voltage is applied to the ST terminal of the starter solenoid 76, the series diode D1 is reversed biased and there is no longer a ground path through the coil of relay K20 and the relay K20 de-energizes. The diode D1 also prevents power at the starter solenoid 76 from energizing the series combination of K20 and K21 when the shift lever 36 is not in neutral. When relay K20 is de-energized with the shift lever 36 in gear, the relay contact is open and the not neutral switch S1 is connected to terminal A of the switch module connector. Therefore, there is no longer any voltage to keep enabling relay K21 energized. If K21 is de-energized, the not neutral line L1 is dead and power cannot be applied to valves B1 and C2.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a control system for a powershift transmission of a vehicle having an engine for driving the transmission, an operator movable shift lever for generating transmission shift signals and movable to a neutral position and to at least one non-neutral position, a plurality of hydraulic pressure operated control elements for engaging a gear of the transmission, a plurality of control valves for controlling pressurization of the control elements, a plurality of driver circuits for controlling operation of the control valves, a source of electrical power, a plurality of electrical connectors which, coupled together in a normal configuration, permit electrical power to be transmitted from the power source to the driver circuits for the control valves for normal operation of the transmission, and which may be coupled together in a limp-home configuration to permit power to be transmitted directly to at least some of the control valves for limited operation of the transmission, a start-in-gear circuit comprising:

- shift lever switches coupled to the shift lever, the shift lever switches opening and closing as a function of the position of the shift lever; and
- a relay circuit operatively connected to the shift lever switches and connected to at least one of the plurality of connectors, the relay circuit and the shift lever switches cooperating to prevent electrical power from being transmitted from the power source to the driver circuits and to prevent motion of the vehicle if the engine is started with the shift lever in a non-neutral position while the plurality of connectors are coupled together in the limp-home configuration, and the relay circuit and the shift lever switches cooperating to allow electrical power to be transmitted from the power source to the driver circuits and to permit motion of the vehicle under control of the shift lever after the shift lever is mover to its neutral position if the engine is started with the shift lever in a non-neutral position while the plurality of connectors are coupled together in the limp-home configuration.

2. The invention of claim 1, wherein:
the plurality of electrical connectors supplies electrical power to the start-in-gear circuit when the plurality of electrical connectors is placed in the normal configuration and the plurality of electrical connectors interrupts the supply of electrical power to the start-in-gear circuit when the plurality of electrical connectors is disconnected from the normal configuration.

3. The invention of claim 1, characterized by:
- a clutch pedal operable by an operator to control transmission of torque through the transmission;
- a limp-home relay connected to a connector of the plurality of electrical connectors; and
- a clutch switch operatively coupled to the clutch pedal and connected between a source of electrical power and to the limp-home relay, the clutch switch and the limp-home relay cooperating when the plurality of electrical connectors are in the limp-home configuration to prevent energization of at least one of the valve drivers unless the clutch pedal is depressed and released.

4. The invention of claim 3, wherein the limp-home relay comprises:
- a first contact connected to a first pin of one of the plurality of connectors, a second contact connected to a second pin of the one connector, a coil having one side grounded and having a second side connected to the second contact and to the clutch switch, and a switch for connecting the first contact to the second contact when the coil is energized.

5. The invention of claim 1, characterized by:
- a neutral switch coupled to the shift lever, the neutral switch connecting electrical power to a neutral line when the shift lever is in its neutral position, the neutral switch connecting electrical power to a not-neutral line when the shift lever is in its non-neutral position;
- an enabling relay having a first contact connected to the not-neutral line, a second contact for connecting to at least one of the control valves, a coil with one side grounded, and a switch for connecting the first contact to the second contact when the coil is energized; and
- a latching relay having a first contact connected to a source of electrical power, a second contact connected to an other side of the coil of the enabling relay, a coil connected between the neutral line and a starter solenoid, and a switch for connecting the first contact to the second contact when the coil is energized.

6. In a control system for a powershift transmission of a vehicle having an engine for driving the transmission, an operator movable clutch pedal operable to control transmission of torque through the transmission, an operator movable shift lever for generating transmission shift signals and movable to a neutral position and to at least one non-neutral position, a plurality of hydraulic pressure operated control elements for engaging a gear of the transmission, a plurality of control valves for controlling pressurization of the control elements, a plurality of driver circuits for controlling operation of the control valves, a source of electrical power, an operator configurable limp-home circuit for supplying electrical power to the driver circuits when the limp-home circuit is placed in a normal configuration and for supplying electrical power directly to the control valves when the limp-home circuit is placed in a limp-home configuration, a start-in-gear circuit comprising:

- a limp-home relay connected to the limp-home circuit; and
- a clutch switch operatively coupled to the clutch pedal and connected between the source of electrical power and the limp-home relay, the clutch switch and the limp-home relay cooperating when the limp-home circuit is in the limp-home configuration to prevent energization of at least one of the valve drivers unless the clutch pedal is depressed and released.

7. The invention of claim 6, wherein:
the limp-home circuit supplies electrical power to the start-in-gear circuit when the limp-home circuit is placed in the normal configuration and the limp-home circuit interrupts the supply of electrical power to the start-in-gear circuit when the limp-home circuit is disconnected from the normal configuration.

* * * * *